United States Patent
Sherry et al.

(10) Patent No.: US 10,013,411 B2
(45) Date of Patent: Jul. 3, 2018

(54) AUTOMATING DATA ENTRY FOR FIELDS IN ELECTRONIC DOCUMENTS

(71) Applicant: Adobe Systems Incorporated, San Jose, CA (US)

(72) Inventors: David Rudi Sherry, San Jose, CA (US); Kirk B. Gould, Cupertino, CA (US); Steve Dakin, San Jose, CA (US); Frederic Thevenet, San Francisco, CA (US); Lalit Vohra, New Delhi (IN); Abhishek Modi, Rajasthan (IN)

(73) Assignee: Adobe Systems Incorporated, San Jose, CA (US)

( * ) Notice: Subject to any disclaimer, the term of this patent is extended or adjusted under 35 U.S.C. 154(b) by 463 days.

(21) Appl. No.: 14/265,999

(22) Filed: Apr. 30, 2014

(65) Prior Publication Data
US 2015/0317295 A1 Nov. 5, 2015

(51) Int. Cl.
*G06F 17/00* (2006.01)
*G06F 17/24* (2006.01)
*G06F 17/21* (2006.01)

(52) U.S. Cl.
CPC .......... *G06F 17/243* (2013.01); *G06F 17/218* (2013.01)

(58) Field of Classification Search
CPC .............................. G06F 17/243; G06F 17/218
See application file for complete search history.

(56) References Cited

U.S. PATENT DOCUMENTS

| | | | | |
|---|---|---|---|---|
| 6,088,700 A | * | 7/2000 | Larsen | G06F 17/243 |
| 6,651,217 B1 | * | 11/2003 | Kennedy | G06F 17/243 |
| | | | | 715/224 |
| 7,216,292 B1 | * | 5/2007 | Snapper | G06F 17/243 |
| | | | | 715/234 |
| 7,426,496 B2 | * | 9/2008 | Kristjansson | G06F 17/243 |
| | | | | 706/10 |
| 8,595,230 B1 | * | 11/2013 | Djabarov | G06F 17/243 |
| | | | | 707/713 |
| 8,751,535 B1 | * | 6/2014 | Kim | G06F 17/30029 |
| | | | | 707/784 |
| 9,218,329 B2 | * | 12/2015 | Lection | G06F 17/243 |
| 2002/0055945 A1 | * | 5/2002 | Endress | G06F 17/243 |
| | | | | 715/255 |
| 2003/0014434 A1 | * | 1/2003 | Sebesta | G06Q 10/10 |
| | | | | 715/254 |
| 2004/0030991 A1 | * | 2/2004 | Hepworth | G06F 17/243 |
| | | | | 715/226 |
| 2004/0044958 A1 | * | 3/2004 | Wolf | G06F 17/218 |
| | | | | 715/255 |
| 2005/0209903 A1 | * | 9/2005 | Hunter | G06Q 10/10 |
| | | | | 705/7.26 |

(Continued)

*Primary Examiner* — Scott Baderman
*Assistant Examiner* — Barbara Level
(74) *Attorney, Agent, or Firm* — Kilpatrick Townsend & Stockton LLP

(57) ABSTRACT

In some embodiments, a document management application determines that a field of a document lacks a tag describing the field. The document management application also determines that data entered into the field of the document corresponds to a value of a field description included in a user profile. The document management application tags or otherwise associates the field with the field description based on the entered data corresponding to the value of the field description.

22 Claims, 10 Drawing Sheets

(56) References Cited

U.S. PATENT DOCUMENTS

| | | | | |
|---|---|---|---|---|
| 2007/0074121 A1* | 3/2007 | Mullender | ........... | G06F 17/3056 715/744 |
| 2008/0313529 A1* | 12/2008 | Gwozdz | ................ | G06F 17/243 715/224 |
| 2014/0195888 A1* | 7/2014 | Alford, Jr. | ............ | G06F 17/243 715/226 |
| 2015/0205777 A1* | 7/2015 | Campanelli | ........... | G06F 17/243 715/226 |

* cited by examiner

| Dashboard | Fill Fields | All Files |

| Form Name | Type | Status | Source |
|---|---|---|---|
| Claim Form | PDF | Incomplete 3/10 | Email |
| Name: | | | *Submit* |
| Date: | | | *Submit* |
| Expense: | | | *Submit* |
| Purchase Order | PDF | Complete | Provider.xyz  *View & Submit* |
| Feeback Survey | HTML | Complete | Survey.xyz  *View & Submit* |

1210
Determine that first and second documents are associated with a user profile and have respective first and second fields that are associated with a field description in the user profile

1220
Determine a first pattern of interactions with the first document that have occurred via the user profile

1230
Determine that a second pattern of interactions with the second document that have occurred via the user profile is different from the first pattern of interactions with the first document

1240
Provide a notification via the user profile based on determining that the first and second patterns are different from each another

FIG. 13

| Dashboard | Fill Fields | All Files | | |
|---|---|---|---|---|
| | Name | "Joe Snuffy" | | Source |
| * | Claim Form | x | | Email |
| | Purchase Order | x | | Provider.xyz |
| | Feeback Survey | Click to fill | | Survey.xyz |
| | Address | "Company X" | | Source |
| * | Claim Form | Click to fill | | Email |
| | Purchase Order | Click to fill | | Provider.xyz |
| | Feeback Survey | Click to fill | | Survey.xyz |

FIG. 14

AUTOMATING DATA ENTRY FOR FIELDS IN ELECTRONIC DOCUMENTS

TECHNICAL FIELD

This disclosure relates generally to computer-implemented methods and systems and more particularly relates to automating data entry for fields in electronic documents.

BACKGROUND

Different types of form documents may require a user to provide the same information. For example, electronic form documents such as a loan application, a customer survey, and a purchase order may all require that a user enter a first name, a last name, a street address, and a telephone number. Manually entering such information into different forms may become cumbersome for a user who has to complete a large number of different forms. Furthermore, manually entering such information into different forms may increase the likelihood of data entry errors, such as the user providing inconsistent information in different forms (e.g., misspelling names, transposing numbers, etc.).

Prior solutions for this problem may present disadvantages. For example, websites may apply tags to documents that identify common fields such as names, e-mail addresses, etc. A web browser application can use these tags to auto-fill a field having a given tag based on data that a user has previously entered in a field of previous web documents. Although such a solution may ease the process of completing some form documents, this solution relies on the provider of the document tagging the fields. Furthermore, although such tagged fields may partially automate the process of initially entering data into multiple form documents, subsequent changes to the user's information (e.g., a change in name, address, etc.) require the user to re-open each document and manually update the information in each document.

It is desirable for a document management solution to identify similar fields in different documents and to automatically enter the same information in similar fields.

SUMMARY

According to certain embodiments, a document management application tags fields of a document with field descriptions to automate the entry of data into similar fields from different documents. The document management application can associate a user profile with multiple electronic documents. The document management application can also maintain field descriptions for fields included in different documents (e.g., a tag in the user profile titled "User's First Name"). The document management application can receive a document and determine that a field of the document lacks a tag or other metadata describing the field. The document management application can identify data entered into the field of the document (e.g., a user typing the name "Joe" into a field of a loan application document). The document management application can determine that the data entered into the field of the first document corresponds to the value for a field description (e.g., a tag in the user profile titled "User's First Name" and having the value "Joe"). The document management application can tag the field with the field description based on the entered data corresponding to the value of the field description. For example, the document management application may apply the tag "User's First Name" to the field in the document in which "Joe" is entered.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where:

FIG. 7 is a modeling diagram depicting an example of an interface of a document management application for automating entry of data into electronic documents according to certain exemplary embodiments;

FIG. 13 is a flow chart illustrating an example of a method for using a document management application to categorize electronic documents for data entry according to certain exemplary embodiments;

FIG. 14 is a modeling diagram depicting an example of an interface of a document management application for categorizing entry of data into electronic documents according to certain exemplary embodiments.

DETAILED DESCRIPTION

Figure 1:
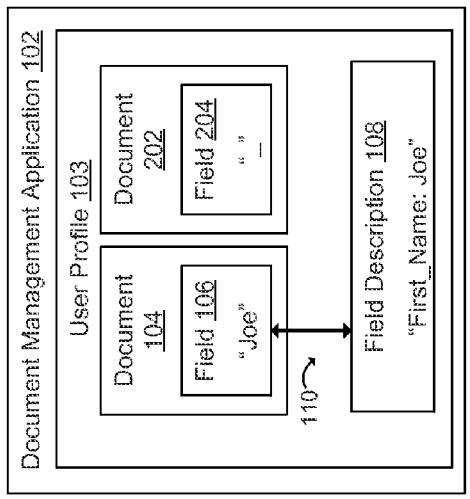
FIG. 1 is a modeling diagram depicting an example of a document management application that can at least partially automate data entry for fields in electronic documents using a field description according to certain exemplary embodiments.

Computer-implemented systems and methods are disclosed for a document management application to tags fields of a document with field descriptions to automate the entry of data into similar fields from different documents. The document management application can use the tags or other metadata to automatically enter or update data in different documents having fields with the same field description (e.g., "first name," "account number," etc.), thereby providing a common tool for managing data entry across different types of documents. The use of the document management application can decrease the amount of manual data entry performed by users and increase the consistency of data entry across different documents.

The following non-limiting example is provided to help introduce the general subject matter of certain embodiments. A document management application may be hosted on a website and may provide a user with access to multiple form documents via the website. For example, the user may have a user profile under which various documents are stored, such as a loan application, a customer survey, a purchase order, etc. The user profile may also include several different tags or other field descriptions that include field descriptions for common fields in a document, such as a "First Name" tag, a "Last Name" tag, etc. The values for the field descriptions may be entered when the user creates the user profile for the document management application (e.g., by entering "Joe" for "First Name" and "Snuffy" for last name). When the user types data into one of the stored documents, the document management application can determine that the entered data matches or otherwise corresponds to data in the tags of the user profile. For example, if the user types "Joe" into a field of the loan application form, the document management application determines that the string "Joe" is the value of the "First Name" field description in the user profile. Based on matching the data entered by the user and the value for the "First Name" tag, the document management application applies the "First Name" tag to the field of the loan application form in which the user has entered "Joe." This process can be repeated for one or more of the other documents associated with the user profile.

In this manner, the document management application can allow a user to efficiently manage the data across different form documents of different types, even if the provider of a given form document does not include any metadata for auto-completing the form document. The document management application can be used to ensure that data is entered consistently across the different documents. For example, if a user changes "Joe" to "Joseph" in a field tagged with "First Name" in a purchase order, the document management application retrieves other documents associated with the user profile that also have fields tagged with "First Name," such as a customer survey. The document management application can automatically change the value of the field in the customer survey from "Joe" to "Joseph" without requiring the user to open and modify the customer survey.

As used herein, the term "field" is used to refer to a portion of an electronic document into which data can be entered or in which entered data can be modified. In some embodiments, an interface that is used to enter data into a field of an electronic document can include one or more visual elements corresponding to a field. For example, a graphical or textual interface for displaying an electronic document may include a visual element corresponding to a field of the document, such as a box or other shape into which data can be entered. The data that is typed or otherwise entered into the shape in the interface is stored in the field of the electronic document. In some embodiments, the document management application can automatically determine that a visual element is used for entering data into a field. In additional or alternative embodiments, the document management application can determine that a visual element is used for entering data into a field based on a user's interaction with the field in the graphical interface.

As used herein, the term "field description" is used to refer to any metadata associated with a field that can be used to identify one or more characteristics of the field. Non-limiting example of such characteristics include a name of the field (e.g., "First Name," "Issue Date," etc.), a category of data to be entered into the field (names, dates, addresses, etc.), a type of data to be entered into the field (e.g., strings, numbers, objects), etc. In some embodiments, the document management application can add metadata to an electronic document that includes the field description. For example, the document management application can tag a field of an electronic document with an associated field description (e.g., by applying a "First_Name" tag to a form field). In another non-limiting example, the document management application can maintain a record for the field description in a separate database or other suitable data structure. The document management application can add metadata to an electronic document that references the record for the field description in the database or other data structure. In additional or alternative embodiments, the document management application can add metadata to an external resource that references the document.

As used herein, the term "user profile" is used to refer to data associated with a logical entity that can be uniquely identified by a document management application. A user profile can be used for entities such as individuals, organizations, etc. A given user can be identified by reference to one or more client accounts, by reference to a software identifier and/or hardware identifier associated with an application and/or device used to access the server system, etc.

The document management application can provide a tool for users to manage data entry for different forms or other electronic documents. In some embodiments, managing data entry for electronic documents can involve using the document management application to identify the status of data entry for different documents (e.g., which documents have incomplete fields) and to enter data into incomplete fields.

In some embodiments, the document management application can provide a common interface that is used to simultaneously enter data in similar fields across different documents via a common action (e.g. entering the same text string in all fields associated with a "First Name" description). The common interface may obviate the need to manually search for incomplete fields in different documents by opening each document and separately entering data in one or more fields of the document. In additional or alternative embodiments, the document management tool can provide a common interface that is used to simultaneously provide completed forms or other documents to different entities (e.g., by clicking a button in the interface to send all completed forms to designated recipients).

Different documents can be imported into or otherwise accessed by the document management application from any suitable source (e.g., e-mail attachments, shared repositories or other data sources accessible to the document management application, web-based forms, etc.). For example, in some embodiments, the document management application can be used to manage data entry for both locally accessible documents and remotely accessible documents. A locally accessible document can be a document that may be modified or otherwise used at a local computing system. An example of such a locally accessible document is a form in a portable document format ("PDF") received as an e-mail attachment or downloaded from a web site. A remotely accessible document can include a web page or other document that is accessible via a web site or other remote resource to obtain data to be stored at the remote resource.

An example of such a remotely accessible document is a web-based survey. The document management application can access the remotely accessible document via any suitable manner (e.g., via a web crawler application) to identify one or more fields in the remotely accessible document. The document management application can generate a locally accessible file that is used for storing data for entry into the remotely accessible document. Generating the locally accessible file can allow the document management application to manage the remotely accessible document in the same manner as a locally accessible document. For example, if a web crawler used by the document management application determines that a web survey includes a "First Name" field, the document management application can reference a user profile to obtain data for "First Name" fields and update a local copy of the web survey field in a locally accessible file for storing data for entry into the remotely accessible document. The document management application can transmit the "First Name" data stored in the locally accessible file to the remote resource at which the remotely accessible document is hosted (e.g., by accessing a web site at which a web survey is hosted and populating fields of the web survey from a locally accessible file used by the document management application).

In additional or alternative embodiments, the document management application can be used to prioritize or otherwise categorize one or more documents for data entry. For example, the document management application may display documents in a particular category (e.g., higher priority documents) more prominently in an interface (e.g., by listing the higher priority documents before lower priority documents) or may display one or more visual indicators that identify higher priority documents (e.g., by displaying an asterisk or exclamation point adjacent to higher priority documents).

The document management application can categorize or otherwise prioritize documents in any suitable manner. In some embodiments, the document management application assigns a priority to a document or otherwise categorizes the document based on a source of the document. In additional or alternative embodiments, the document management application assigns a priority to a document or otherwise categorizes the document based on detecting content within the document that is indicative of a priority (e.g., detecting text in the document stating "Return by Apr. 15, 2014") or other category. In additional or alternative embodiments, the document management application assigns a priority to a document or otherwise categorizes the document based on a user's previous behavior with respect to a similar document. For example, the document management application may determine that a user completed all required fields of an income tax form for the year 2013 within 30 days of receiving the document. The document management application may determine that a user has not completed all required fields of an income tax form for the year 2014 within 30 days of receiving the document. The document management application may send an alert or other notification to the user based on the difference between the user's interactions with respect to the 2013 tax form (i.e., completion within 30 days) and the 2014 tax form (i.e., absence of completion after 30 days).

Referring now to the drawings, FIG. 1 is a modeling diagram depicting an example of a document management application 102 that can at least partially automate data entry for fields in electronic documents using a field description 108. For example, the document management application 102 can automatically enter data (e.g., the string "Joe") into a field 106 of the document 104 based on the field 106 having an association 110 with the field description 108 titled "First_Name" and having the value "Joe."

Figure 15:
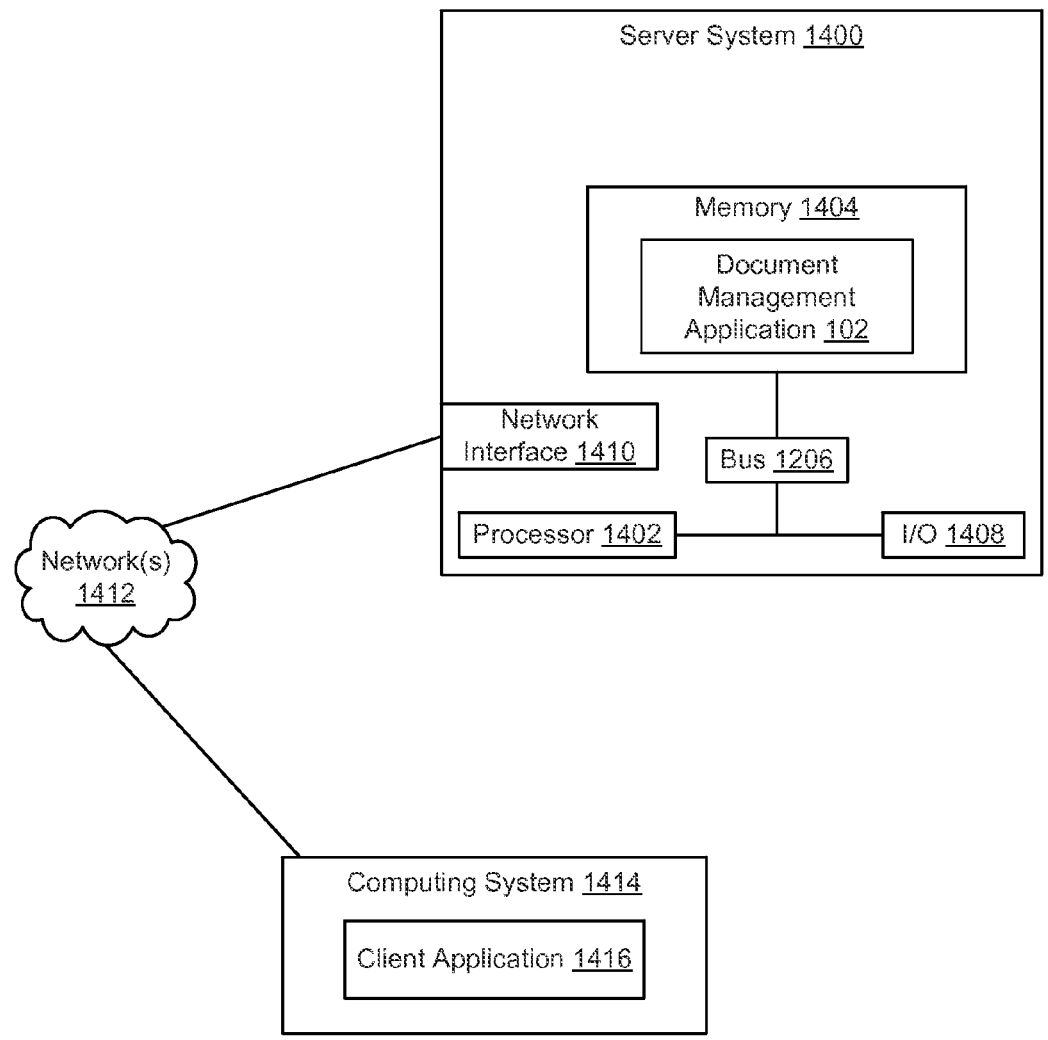
FIG. 15 is a block diagram depicting an example server system for implementing certain embodiments.

In some embodiments, the document management application 102 depicted in FIG. 1 can be hosted or otherwise implemented by any suitable server system and can be accessed by other computing devices via any suitable data network (see, e.g. FIG. 15). For example, the document management application 102 may be executed on a server system accessible by other computing devices via the Internet (e.g., via a Web-based or other network interface). In other embodiments, the document management application 102 can be executed by one or more processing devices on a computing system such as a desktop computer, a laptop, etc.

FIG. 1 depicts a user profile 103 that is associated with (and is used to access) the document management application 102. The user profile 103 is associated with the document 104 and the field description 108. In some embodiments, the user profile 103 may also include information for authenticating a user. Non-limiting examples of such authentication information include a user name, a password, one or more security questions, etc.

The document management application 102 uses the field description 108 to manage data entry for one or more documents 104. The field description 108 includes metadata that describes one or more aspects of the field 106. A non-limiting example of a field description 108 is a tag. The example field description 108 depicted in FIG. 1 includes a field name (i.e., "First_Name") and a field value (i.e., "Joe"). The field description 108 indicates that managed documents having fields associated with the field description 108 are first names. The field description 108 also indicates that the data to be entered into such fields is the text string "Joe."

The association 110 between the field 106 and the field description 108 can be implemented in any suitable manner. In one non-limiting example, the document management application 102 can add the field description 108 to metadata of the document 104. In another non-limiting example, the document management application 102 can maintain a record for the field description 108 in a database or other suitable data structure. The document management application 102 can add metadata to the document 104 that references the record for the field description 108 in the database or other data structure. In another non-limiting example, the document management application 102 can add metadata to an external resource that references the document 104 without modifying the document 104 to create the association 110.

The document management application 102 can obtain the document 104 in any suitable manner. In some embodiments, the document management application 102 can access an e-mail account associated with the user profile 103. The document management application 102 can retrieve one or more documents that are included as e-mail attachments to messages of the e-mail account or that are identified by links within the text of the e-mail messages. In additional or alternative embodiments, the document management application 102 can access a shared repository or other data structure that is accessible using a user profile 103. The document management application 102 can copy or generate a link to the document 104 in the shared repository that is associated with the user profile 103.

The document management application 102 can identify a field 106 of the document 104 in any suitable manner. In one non-limiting example, the document 104 may be a form such as a PDF document having fillable fields. The document management application 102 can identify the fillable fields from the metadata of the PDF document. For example, a crawler application used by the document management application 102 may detect the presence of fields marked as form fields in a PDF document. A crawler application may be any application that can automatically scan, detect, read, or otherwise use the content of a document without manual input by a user.

In another non-limiting example, the document 104 may be an image file. The document management application 102 may scan or otherwise analyze the document 104 to detect one or more portions of the image file that can be used as fields. For example, the document management application 102 can convert an image file to a PDF file. The document management application 102 can perform optical character recognition ("OCR") or another suitable algorithm to detect content in the converted PDF file. The document management application 102 can determine that one or more shapes or spaces in the image file appear to be appropriate for data entry (e.g., a line segment below white space or a rectangle surrounding white space that is adjacent to text). The document management application 102 can automatically identify a shape or space as a field 106 and/or display a prompt to a user soliciting input to confirm that the shape or space is the field 106.

In some embodiments, the document management application 102 can automatically determine that a visual element in a document is used for entering data into a field. For example, some forms (e.g., HTML documents) may have fields that are defined for data input. A user can select the input field to enter data into the field. In additional or alternative embodiments, the document management application 102 can determine that a visual element is used for entering data into a field based on a user's interaction with the field. For example, in a document such as an image, a user can click a portion of the image or otherwise interact with the image portion. The document management application 102 can create a field in the image document at the image portion based on the user's interaction with the image portion.

Figure 2:
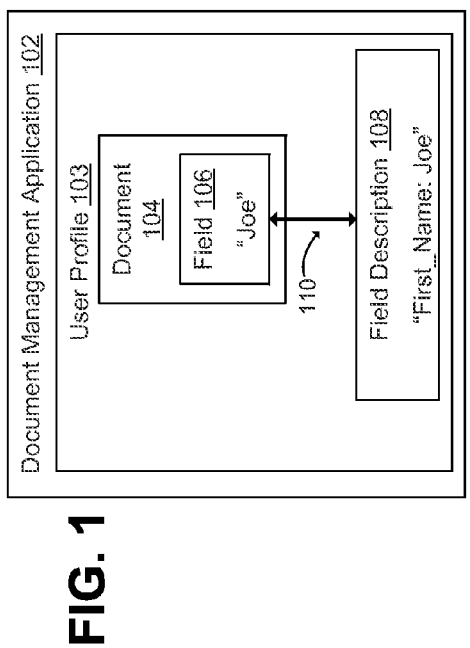
FIG. 2 is a modeling diagram depicting an example of the document management application receiving an additional electronic document for which data entry may be automated according to certain exemplary embodiments.

FIG. 2 is a modeling diagram depicting an example of the document management application 102 receiving an additional electronic document 202 for which data entry may be automated. The document 202 can be provided to the document management application 102 via any suitable electronic communication (e.g., uploading the document 202 via a website for accessing the document management application 102, sending the document 202 in an e-mail attachment to a server that executes or is in communication with the document management application 102, etc.).

As depicted in FIG. 2, the document 202 includes a field 204 without any entered data. The document management application 102 can use the field description 108 to at least partially automate the entry of data into the field 204.

Figure 3:
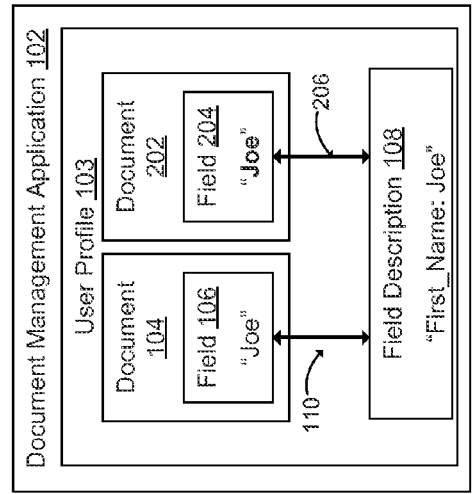
FIG. 3 is a modeling diagram depicting an example of the document management application associating a field description with the received document according to certain exemplary embodiments.

For example, FIG. 3 is a modeling diagram depicting an example of the document management application 102 associating the field description 108 with the document 202. An association 206 between the field 204 and the field description 108 is depicted as a bidirectional arrow in FIG. 3. The association 206 may be implemented in any suitable manner, as described above with respect to FIG. 1.

The document management application 102 can use any suitable process for determining that the field description 108 is to be associated with the field 204. In some embodiments, the document management application 102 generates the association 206 based on data being entered into the field 204 that at least partially matches the value of the field description 108. For example, a user may type "J" into the field 204. The document management application 102 determines that the letter "J" partially matches the string "Joe" in the field description 108. The document management application 102 generates the association 206 between the field 204 and the field description 108 based on the partial match between the letter "J" and the string "Joe." Although the match of a single letter is used as a simple example, the document management application 102 may use any suitable matching algorithm, such as algorithms requiring the use of additional matching criteria or more complex matching criteria.

In additional or alternative embodiments, the document management application 102 determines the association 206 based on analyzing the content of the document 202. In one non-limiting example, the document management application 102 may determine that the field 204 is positioned adjacent to the phrase "First Name." The document management application 102 can associate the field 204 with the field description 108 based on determining the position of the field 204 in the document 202. In another non-limiting example, the document management application 102 may determine that a field has one or more characteristics suitable for entering a given type of data. For instance, the document management application 102 may determine that a field includes a series of underscores and dashes that are indicative of a number (e.g., "_ _ _-_ _-_ _ _ _" for entering a social security number, "(_ _ _)-_ _ _-_ _ _ _" for entering a phone number, etc.). The document management application 102 can associate a field description for such a number (e.g., "Phone," "SSN") with the field.

In some embodiments, the document management application 102 solicits confirmation from a user prior to associating a field 204 with a field description 108. For example, the document management application 102 can respond to identifying a potential association between the field 204 and the field description 108 by displaying a prompt next to the field 204. The prompt can solicit input from the user regarding whether the field 204 should be associated with the field description 108. Examples of such prompts include a query (e.g. "Do you mean 'Joe'?"), a suggestion for completing the field 204 (e.g., displaying "Joe" adjacent to the field), an inquiry about the field (e.g., "Is this a field for entering your first name?"), etc. If the user responds affirmatively to the prompt, the document management application 102 generates the association 206 between the field 204 and the field description 108.

Figure 4:
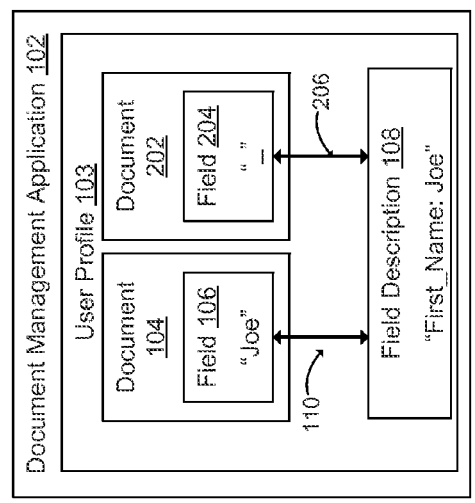
FIG. 4 is a modeling diagram depicting an example of the document management application using the associated field description to enter data into the received document according to certain exemplary embodiments.

FIG. 4 is a modeling diagram depicting an example of the document management application 102 using the associated field description 108 to enter data into the document 202. For example, as depicted in FIG. 4, the document management application 102 populates the field 204 with the string "Joe" included in the field description 108.

Although FIGS. 1-4 depict (for illustrative purposes) two documents, each of which has a single field storing a text string, other implementations are possible. The document management application 102 can be used to manage any number of documents having any type of data that is stored in any number of fields.

For illustrative purposes, FIGS. 1-4 depict the documents 104, 202 and the field description 108 within a user profile 103 to depict an association between the documents 104, 202. Although a single user profile 103 is depicted in FIGS. 1-4, any number of user profiles can be associated with a given document. For example, multiple user profiles may be associated with the same document.

Any suitable process may be used to associate the documents 104, 202 and the field description 108 with the user profile 103. For example, a database or other suitable data structure may include a record for the user profile 103 and a record for the field description 108. The record for the user profile 103 can include a reference to the record for the field description 108 (or vice versa). In some embodiments, each of the documents 104, 202 can include a document identifier. The record for the user profile 103 can include references to the document identifiers for the respective documents 104, 202 (or vice versa). In additional or alternative embodiments, a unique hash for each of the documents 104, 202 can be used to identify the documents 104, 202.

Figure 5:
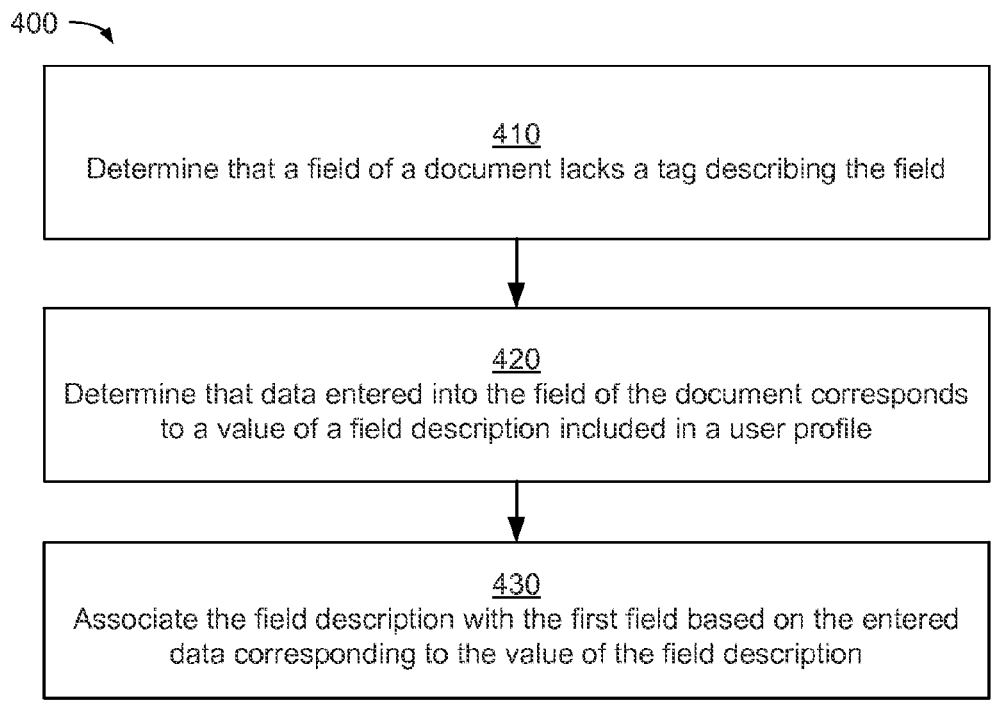
FIG. 5 is a flow chart illustrating an example of a method for tagging a field of an electronic document with a field description according to certain exemplary embodiments.

FIG. 5 is a flow chart illustrating an example of a method 400 for tagging a field of an electronic document with a field description according to certain exemplary embodiments.

The method 400 involves determining that a field of a document lacks a tag describing the field, as depicted in block 410. For example, as described above with respect to FIG. 3, the document management application 102 can be executed by a suitable processing device to receive a document 202. The document 202 can be associated with the user profile 103. The document management application 102 can determine that the document 202 includes at least one field 204. The document management application 102 can analyze the document 202 to determine that no tag or other metadata is included in the document that identifies an association between the field 204 and a field description.

In some embodiments, determining that the field 204 lacks a tag can include determining that no metadata in the document 202 and/or the user profile 103 is present. In other embodiments determining that the field 204 lacks a tag can include determining that no metadata in the document 202 and/or the user profile 103 can include determining that one or more tags or other metadata in the document 202 or the user profile 103 can be used to identify an association between the field 204 and the field description 108.

The method 400 also involves determining that data entered into the field 204 of the document 202 corresponds to a value of a field description 108 included in a user profile 103, as depicted in block 420. For example, as described above with respect to FIG. 3, the document management application 102 can be executed by a suitable processing device to compare data entered into a field 204 of a document 202 with a value of a field description 108. The document management application 102 can determine that at least some of the entered data matches the value of the field description 108. In a non-limiting example, the document management application 102 can determine that the character "J" corresponds to the string "Joe" in the field description "First_Name."

The method 400 also involves tagging or otherwise associating the field 204 of the document 202 with the field description 108 based on the entered data corresponding to the value of the field description 108, as depicted in block 430. For example, the document management application 102 can be executed by a suitable processing device to create an association 206 between a field 204 and a field description 108. The processing device can create the association 206 by adding a tag or other metadata to the document 104 that indicates that the field 204 is associated with the field description 108. The tag or other metadata can include the name of the field description 108 (e.g., "First_Name"), a reference to a record for the field description 108 in a data structure (e.g., a location of a database and a record identifier), etc.

In some embodiments, the document management application 102 can solicit input from a user to confirm that the field should be associated with the field description, as described above with respect to FIG. 3. In other embodiments, the processing device may associate the field description 108 with the field 204 without soliciting such confirmatory input.

In some embodiments, the document management application 102 can solicit input from a user to confirm that the field 204 be tagged or otherwise associated with the field description 108, as described above with respect to FIG. 3. In other embodiments, the processing device may associate the field description 108 with the field 204 without soliciting such confirmatory input.

In some embodiments, the document management application 102 can perform one or more of the operations described with respect to blocks 420, 430 based on determining that the field 204 lacks a tag.

Figure 6:
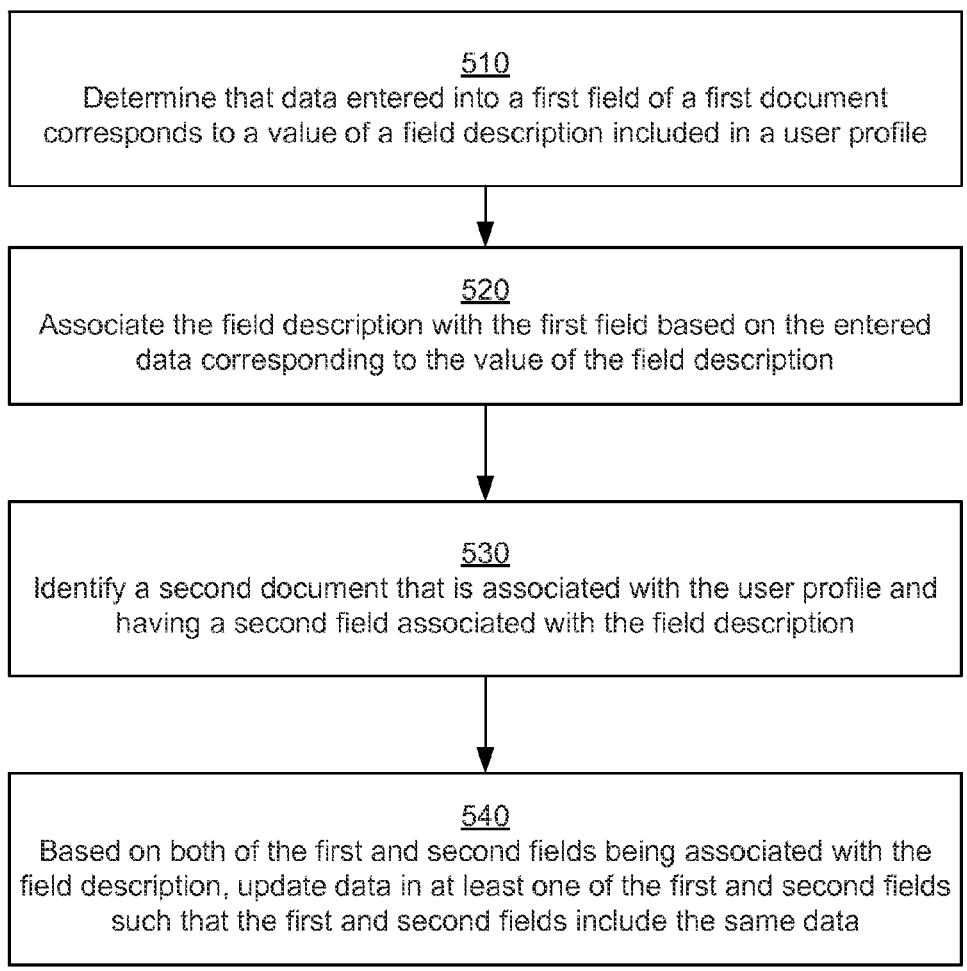
FIG. 6 is a flow chart illustrating an example of a method for automatically entering at least some data in fields of electronic documents according to certain exemplary embodiments.

Tagging or otherwise associating fields with a field description can allow for automatically updating similar fields in multiple documents. FIG. 6 is a flow chart illustrating an example of a method 500 for automatically entering at least some data in fields of electronic documents. For illustrative purposes, the method 500 is described with reference to the exemplary implementation depicted in FIGS. 1-4. Other implementations, however, are possible.

The method 500 involves determining that data entered into a first field of a first document corresponds to a value of a field description included in a user profile, as depicted in block 510. For example, as described above with respect to FIG. 3, the document management application 102 can be executed by a suitable processing device to compare data entered into a field 204 of a document 202 with a value of a field description 108. The document management application 102 can determine that at least some of the entered data matches the value of the field description 108.

The method 500 also involves associating the field description with the first field based on the entered data corresponding to the value of the field description, as depicted in block 520. For example, the document management application 102 can be executed by a suitable processing device to create an association 206 between a field 204 and a field description 108. In some embodiments, the processing device can create the association 206 by adding a tag or other metadata to the document 104 that indicates that the field 204 is associated with the field description 108. The tag or other metadata can include the name of the field description 108 (e.g., "First_Name"), a reference to a record for the field description 108 in a data structure (e.g., a location of a database and a record identifier), etc.

In some embodiments, the document management application 102 can solicit input from a user to confirm that the field should be associated with the field description, as described above with respect to FIG. 3. In other embodiments, the processing device may associate the field description 108 with the field 204 without soliciting such confirmatory input.

The method 500 also involves identifying a second document that is associated with the user profile and having a second field associated with the field description, as depicted in block 530. For example, the document management application 102 can be executed by a suitable processing device to identify that the documents 104, 202 include fields 106, 204 associated with the field description 108. In a non-limiting example, the processing device may access a database or other data structure to determine that the user profile 103 references (or is referenced by) the documents 104, 202. The processing device can also reference tags or other metadata in the documents 104, 202 to determine that fields 106, 204 are associated with the field description 108.

The method 500 also involves updating data in at least one of the first and second fields such that the first and second fields include the same data, as depicted in block 540. The data is updated based on both of the first and second fields being associated with the field description. For example, the document management application 102 can be executed by a suitable processing device to perform operations involved in updating the data. The processing device can identify the value for the field description 108 (e.g., "Joe"). The processing device can enter the identified value into one of the fields 106, 204.

In some embodiments, updating one of the fields 106, 204 can involve adding the value of the field description 108 to a blank or incomplete field. For example, as described above with respect to FIG. 4, the document management application 102 can add the string "Joe" to the field 204 based on creating the association 206 between the field 204 and the field description 208.

In additional or alternative embodiments, updating one of the fields 106, 204 can involve detecting a change to the data in a field of a first document and applying the change to the field description 108 and fields in other document associated with the field description 108. For example, after the string "Joe" has been entered into the field 204, a user may discover that his full legal name "Joseph" should be used in the document 202. The user can change the data in the field 204 from the string "Joe" to the string "Joseph." The document management application 102 detects the change to the field 204. Based on detecting the change, the document management application 102 can change the value of the field description 108 from "Joe" to "Joseph." The document management application 102 can retrieve any other documents having fields associated with the field description 108 (e.g., document 104 having field 106). The document management application 102 can modify the other documents so that the string "Joseph" is entered into each of the fields associated with the field description 108.

In some embodiments, the document management application 102 can update the field description 108 and/or the other documents automatically and without soliciting additional input from the user. In other embodiments, the document management application 102 can solicit confirmatory input from the user prior to updating the field description 108 and/or the other documents. For example, the document management application 102 may provide the user with options to replace the value of the field description 108 (e.g., from "Joe" to "Joseph"), to append the new field data to the value of the field description 108 (e.g., from "Joe" to "Joe, Joseph"), and/or to create a new field description to be associated with the modified field (e.g., a field description titled "Legal_First_Name" having a value "Joseph").

In additional or alternative embodiments, the document management application 102 allows the user to complete or update fields associated with a field description 108 in multiple documents without the user having to open any of the documents for display. For example, FIG. 7 is a modeling diagram depicting an example of an interface 602 of a document management application 102 for automating entry of data into electronic documents. The interface 602 includes a dashboard interface 604 that can be used to determine which documents have fields with missing or incomplete data. As depicted in FIG. 7, the document management application 102 manages three documents titled "Claim Form," "Purchase Order," and "Feedback Survey." The dashboard interface 604 displays information about each of the documents, such as the type of document (e.g., "PDF," "HTML") or the source of the document (e.g., an e-mail attachment or the websites "Provider.xyz" and "Survey.xyz").

The document management application 102 can determine which documents have fields that require data entry. For example, in some embodiments, a user may identify one or more fields to be included in a "fill list." The fill list can include a list of field descriptions for fields that can be automatically populated in multiple documents. The fields can be automatically populated using the dashboard interface 604 without opening each document for separate data entry operations. The dashboard interface 604 can be used to enter data for a given field item, automatically enter the data for the field item into multiple documents having fields associated with the field item, and save the documents with the entered data. In some embodiments, such a fill list can be presented in an interface on computing devices having smaller display screens (e.g., tablets, smart phones, etc.). Presenting the fill list can obviate the need to navigate different fillable documents on devices having small screens.

For example, as depicted in FIG. 7, the document management application 102 determines that the document "Claim Form" has fields associated with the field descriptions titled "Name," "Date," and "Expense." The document management application 102 displays the field descriptions in the dashboard interface 604. For fields with missing data, the document management application 102 displays a blank data entry field next to each of the field descriptions. The user can enter the appropriate data into each blank data entry field and click a "submit" button to enter the data into the document. Additionally or alternatively, the document management application 102 can identify stored values for one or more of the field descriptions and display the identified values in the dashboard interface 604 as suggestions. For example, the field description titled "Name" may have a value "Joe Snuffy." The document management application 102 displays "Joe Snuffy" as a suggested value for the "Name" field in the "Claim form" document. The user can click a "submit" button to enter the string "Joe Snuffy" into the "Name" field of the "Claim form" document.

In additional or alternative embodiments, the document management application 102 can provide one or more controls in the dashboard interface 604 for submitting documents in which all required fields have been completed. For example, in FIG. 7, the interface 602 displays each of the forms "Purchase Order" and "Feedback Survey" as having a "Complete" status. In one non-limiting example, the document management application 102 can determine a "Complete" status based on each document having data entered into all fields. In another non-limiting example, the document management application 102 can determine a "Complete" status based on each document having data entered into all fields for which data entry is required, even if the documents include empty or incomplete fields for which data entry is optional. The document management application 102 can update the interface 602 to include buttons labeled "View & Submit" that are adjacent to the items having a "Complete" status. Clicking a "View & Submit" button can open a preview interface that displays the corresponding document having all fields completed. The completed form can be submitted to a designated recipient directly from the interface 602.

The document management application 102 can use any suitable process to determine whether data entry into one or more fields is required or optional. In some embodiments, the document management application 102 can analyze content of the documents 104, 202 to determine whether the fields 106, 204 are optional fields or required fields. For example, the document management application 102 may determine that each of the fields 106, 204 is adjacent to a type of content indicating that the entry of data into a field is required (e.g., an asterisk, the word "required," etc.). In another example, the document management application 102 may determine that one or more of the fields 106, 204 is adjacent to a type of content indicating that the entry of data into a field is optional (e.g., the word "optional"). The document management application 102 can identify any fields adjacent to the "optional" indicator as optional fields and identify any other fields as required fields. In additional or alternative embodiments, the document management application 102 can determine whether the fields 106, 204 are optional fields or required fields based on previous interactions with similar documents. For example, the document management application 102 may identify fields as optional fields based on a user having previously left those fields blank in similar documents.

Figure 8:
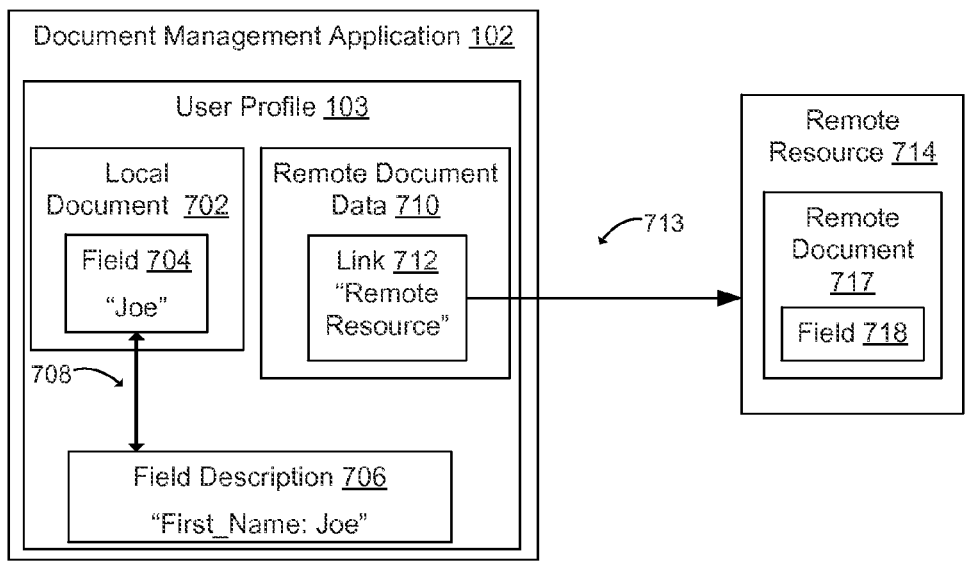
FIG. 8 is a modeling diagram depicting an example of a document management application that can at least partially automate data entry for both locally accessible electronic documents and remotely accessible electronic documents according to certain exemplary embodiments.

In additional or alternative embodiments, the document management application 102 can provide a common interface for entering data into both locally accessible electronic documents and remotely accessible electronic documents. FIG. 8 is a modeling diagram depicting an example of a document management application 102 that can at least partially automate data entry for both locally accessible electronic documents and remotely accessible electronic documents. As depicted in FIG. 8, the document management application 102 manages a local document 702 that is locally accessible and remote document data 710 for a remotely accessible document.

The local document 702 has a field 704 that is associated with a field description 706. The association 708 between the field 704 and the field description 706 can be implemented in any suitable manner, as described above with respect to FIGS. 1-5. A non-limiting example of a local document 702 is a document that is downloaded to a non-transitory computer-readable medium included in a system at which the document management application 102 is executed. For example, the document management application 102 may download a local document 702 such as a PDF document and store the PDF document in a computer-readable medium accessible to the document management application 102.

The remote document data 710 includes data to be entered into a remote document 717 hosted at a remote resource 714. In a non-limiting example, the remote document 717 may be a web-based form (e.g., a survey) that is provided via a website hosted by a web server or other remote resource 714. The field 718 can be used to by the remote resource 714 to obtain data that is to be stored at the remote resource 714 (e.g., data entered into a web survey).

The document management application 102 can use the remote document data 710 to access the remote document 717 and identify one or more fields 718 of the remote document 717. The remote document data 710 can include a link 712 for accessing the remote document 717 at the remote resource 714. A non-limiting example of a link 712 is a uniform resource locator ("URL") or other network identifier that identifies a network location of the remote resource 714. The document management application 102 can access the remote document 717 via a suitable electronic communication 713 that is addressed using the link 712. For example, the document management application 102 may execute a web crawler or other suitable application to access a web page or other remote document 717. The web crawler or other suitable application can identify the field 718 and any other relevant information about the remote document 717.

Figure 9:
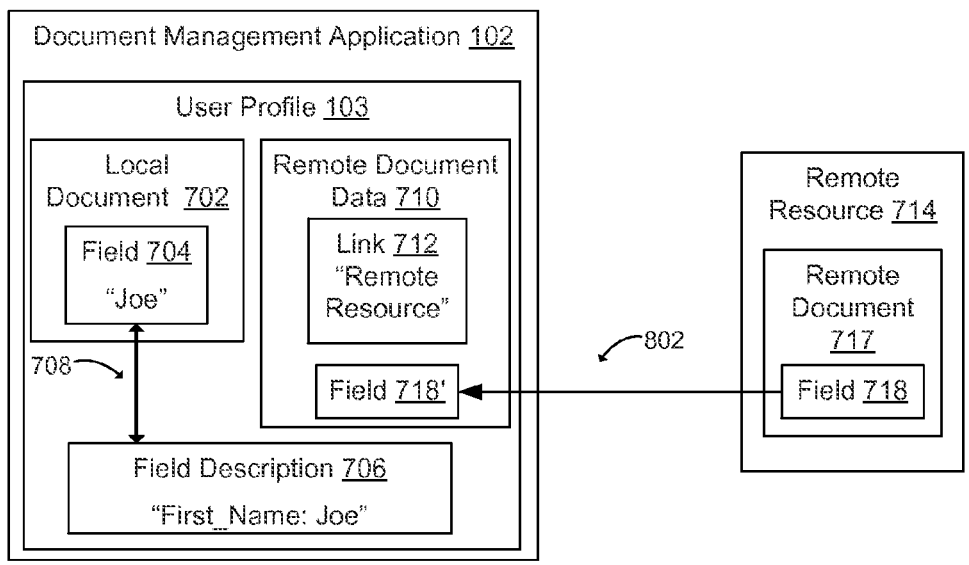
FIG. 9 is a modeling diagram depicting an example of the document management application identifying a field for data entry in a remotely accessible electronic document according to certain exemplary embodiments.

FIG. 9 is a modeling diagram depicting an example of the document management application 102 identifying a field 718 for data entry in a remotely accessible electronic document 717. For example, a web crawler or other suitable application can transmit an electronic communication 713 to the document management application 102 that identifies the field 718 and any other relevant information about the remote document 717. The document management application 102 can modify the remote document 710 to include data for the field 718. For example, as depicted in FIG. 9, the document management application 102 modifies the remote document data 710 to include a field 718'. The field 718' is used to store data that is locally accessible by the document management application 102 and that is to be entered into the field 718 at the remote document 717.

In a non-limiting example, remote document data 710 for one or more remotely accessible electronic documents 717 can be generated by identifying links to different web pages and using crawler applications to identify fields. For example, an e-mail or other document associated with a user profile may be scanned by the document management application 102. The document management application 102 can determine that the e-mail includes a link 712 to a remote resource, such as a web site hosting online surveys. The document management application 102 can generate the remote document data 710 and store the link 712 in the remote document data 710. The document management application 102 can access or generate a crawler application that can access the remote document 717 using the link 712. The crawler application can detect one or more fields 718 in the remote document 717. For example, a web form crawler can detect forms on a web page by scanning for a "form" tag in the HTML of the web page. The web form crawler can identify different fields based on a "name" attribute of an "input" tag included in the HTML of the web page. The crawler application can send an electronic communication 802 to the document management application 102 that describes or otherwise identifies the one or more fields 718. The document management application 102 can modify the remote document data 710 to include one or more fields 718' that can be used to obtain data for entry into the one or more remote fields 718. In some embodiments, different crawler applications can be used for different remote resources. For example, a crawler application may be used that is specifically configured for accessing forms provided by a given remote resource 714.

Figure 10:
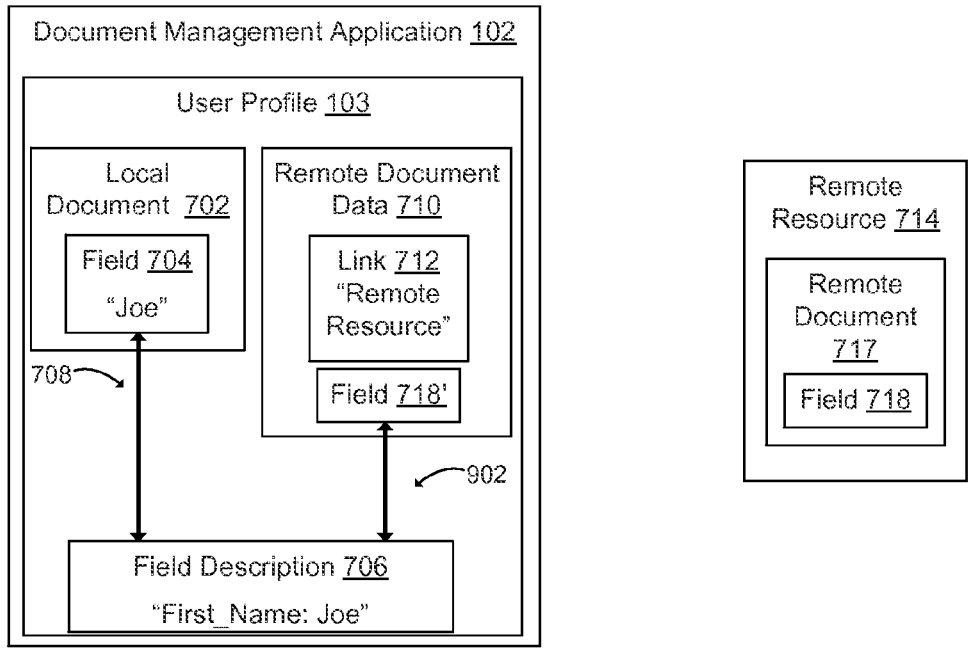
FIG. 10 is a modeling diagram depicting an example of the document management application associating a field description with the identified field from the remotely accessible electronic document according to certain exemplary embodiments.

The document management application 102 can associate the locally accessible field 718' with the field description 706. For example, FIG. 10 is a modeling diagram depicting an example of the document management application 102 associating the field description 706 with the identified field 718 from the remotely accessible electronic document 717. As depicted in FIG. 10, the document management application 102 generates an association 902 between the field description 706 and the field 718' of the remote document data 710. The association 902 can be generated in any suitable manner, as described above with respect to FIG. 3.

Figure 11:
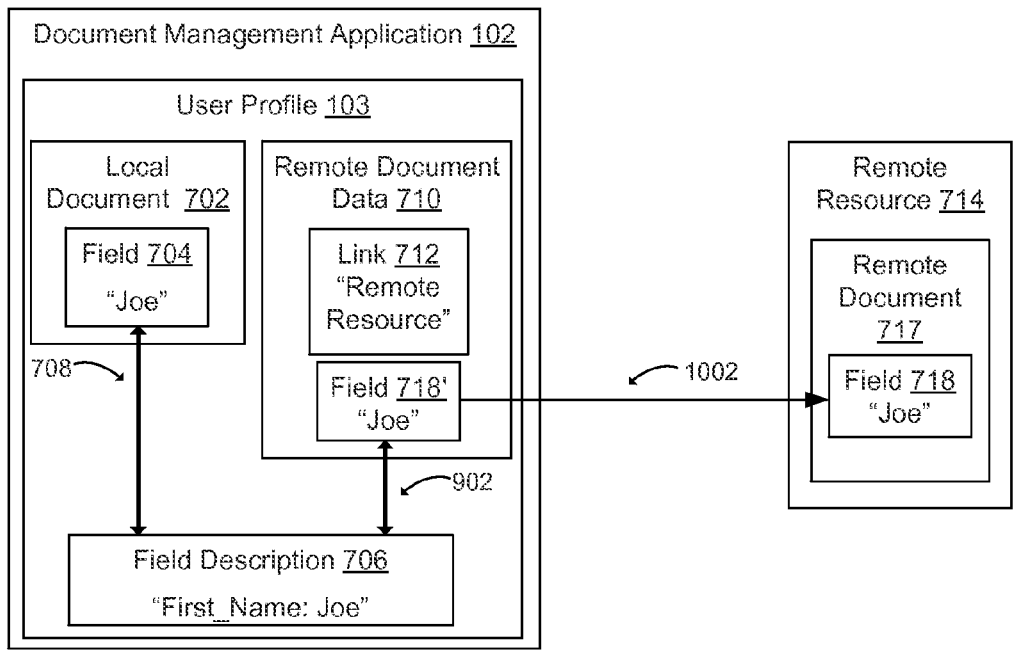
FIG. 11 is a modeling diagram depicting an example of the document management application using the associated field description to enter data into the field of the remotely accessible electronic document according to certain exemplary embodiments.

The association 902 between the field description 706 and the field 718' of the remote document data 710 can allow the document management application 102 to provide a common tool for entering data into similar fields of both the local document 702 and the remote document 717. For example, FIG. 11 is a modeling diagram depicting an example of the document management application 102 using the field description 708 to enter data into the field 718 of the remotely accessible electronic document 717. The document management application 102 uses the value of the field description 706 (e.g., the string "Joe") to enter data into the field 718' that is associated with the field description 706. The document management application 102 accesses the remote document 717 at the remote resource 714. The document management application 102 transmits the data in the field 718' (e.g., the string "Joe") to the remote resource 714 via a suitable electronic communication 1002. For example, the document management application 102 can initiate a web visit to a web site (i.e., the remote resource 714) and enter the data from the field 718' into the field 718 of a web page (i.e., the remote document 717) at the web site.

Figure 12:
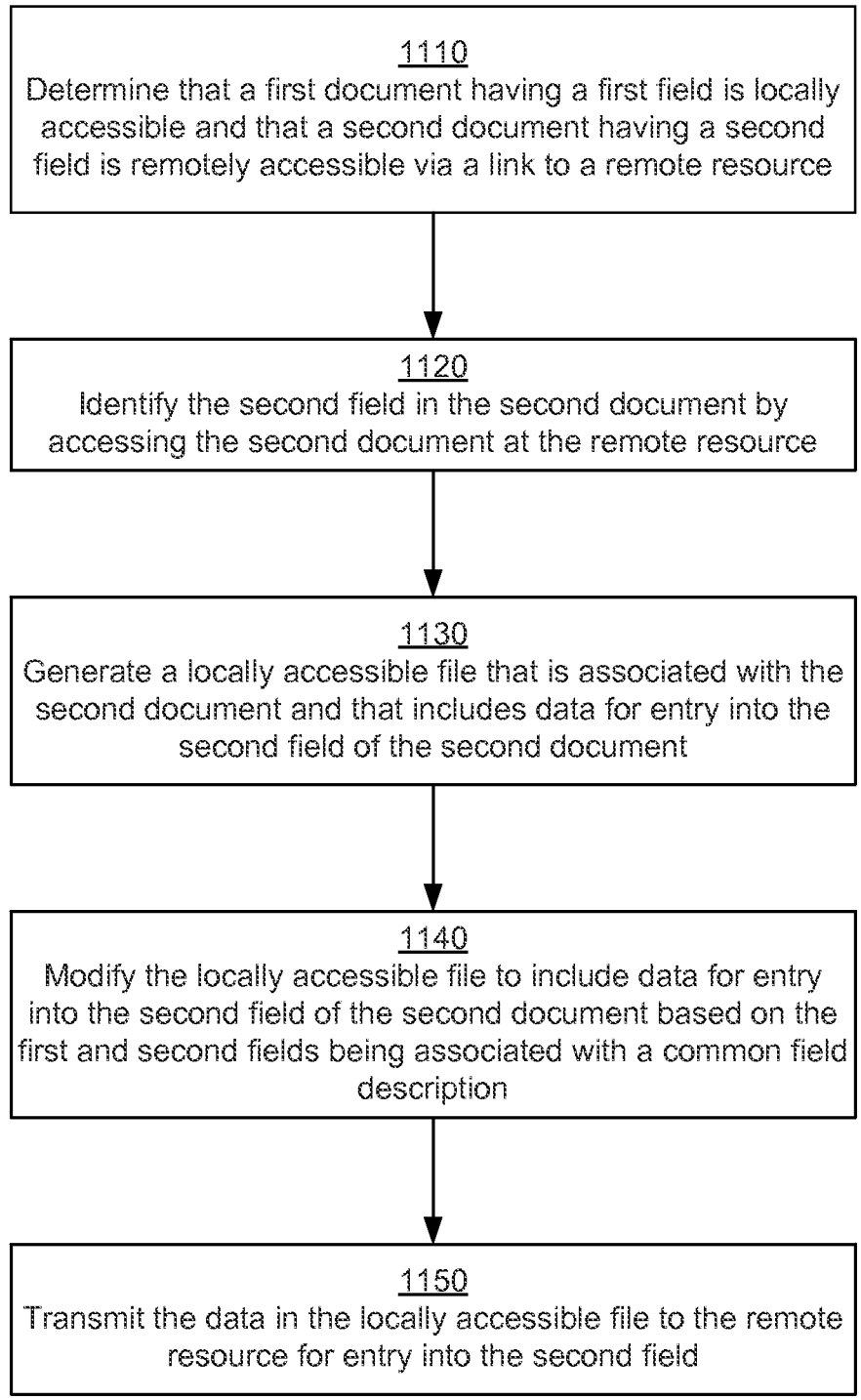
FIG. 12 is a flow chart illustrating an example of a method for using a document management application to manage data entry for both locally accessible electronic documents and remotely accessible electronic documents according to certain exemplary embodiments.

FIG. 12 is a flow chart illustrating an example of a method 100 for using a document management application to manage data entry for both locally accessible electronic documents and remotely accessible electronic documents. For illustrative purposes, the method 1100 is described with reference to the exemplary implementation depicted in FIGS. 1-10. Other implementations, however, are possible.

The method 1100 involves determining that a first document having a first field is locally accessible and that a second document having a second field is remotely accessible via a link to a remote resource, as depicted in block 1110. For example, as described above with respect to FIG. 8, the document management application 102 can be executed by a suitable processing device to manage data entry for a local document 702. The document management application 102 can also be executed by a suitable processing device to determine that a remote document 717 hosted at a remote resource 714 is also available for data entry.

The method 1100 also involves identifying the second field in the second document by accessing the second document at the remote resource, as depicted in block 1120. For example, the document management application 102 can be executed by a suitable processing device to transmit an electronic communication 713 to a remote resource 714, as described above with respect to FIG. 8. The suitable processing device can obtain information about a field 718 of the remote document 717 via another electronic communication 802, as described above with respect to FIG. 9.

The method 1100 also involves generating a locally accessible file that is associated with the second document and that includes data for entry into the second field of the second document, as depicted in block 1130. For example, the document management application 102 can be executed by a suitable processing device to generate a locally accessible file and store the remote document data 710 in the locally accessible file. In a non-limiting example, the processing device may generate a record for the remote document data 710 in a database or other data structure. Such a record may include data such as (but not limited to) an identifier of the user profile 103 with which the remote document data 710 is associated, a link 712 or other identifier for the remote document 717 with which the remote document data 710 is associated, and a field 718' that is used to store data to be entered into a corresponding field 718 of the remote document 717.

The method 1100 also involves modifying the locally accessible file to include data for entry into the second field of the second document based on the first and second fields being associated with a common field description, as depicted in block 1140. For example, the data in the field 718' may be updated based on a change to the field description 706. The document management application 102 can be executed by a suitable processing device to identify the value for the field description 706 (e.g., "Joe") and enter the value into the field 718'.

The method 1100 also involves transmitting the data in the locally accessible file to the remote resource for entry into the second field, as depicted in block 1150. For example, the document management application 102 can be executed by a suitable processing device to transmit a suitable electronic communication 1002 to the remote resource 714. The electronic communication 1002 can involve, for example, establishing a session with a web server or other remote resource 714 for accessing a web page or other remote document 717. The processing device can access a record for the remote document data 710 from a database or other suitable data structure. The processing device can retrieve data from the field 718' of the record. The processing device can enter the data retrieved from the field 718' into the field 718 at the remote document via the electronic communication 1002.

In other embodiments, the document management application 102 can transmit data retrieved from the field 718' to the remote resource 714 after displaying an interface for the remote document 717 to a user. For example, the remote resource 714 may be a web site and the remote document 717 may be a web page of the web site. The document management application 102 can execute a browser application to access the web page using the link 712. The document management application 102 can cause the browser application to display the remote document 717 and display the data retrieved from the field 718' in the web page at the appropriate location. The document management application 102 and/or the browser application can transmit the data retrieved from the field 718' to the remote resource 714 in response to the user clicking a "submit" button or entering some other appropriate command at the document management application 102 and/or the browser application. In other embodiments, the document management application 102 can transmit data retrieved from the field 718' to the remote resource 714 without displaying the remote document 717 to the user.

In additional or alternative embodiments, the document management application 102 can be used to prioritize or otherwise categorize one or more documents for data entry. For example, FIG. 13 is a flow chart illustrating an example of a method 1200 for using a document management application 102 to categorize electronic documents for data entry.

The method 1200 involves determining that first and second documents are associated with a user profile and have respective first and second fields that are associated with a field description in the user profile, as depicted in block 1210. For example, a document management application 102 can be executed by a suitable processing device to manage documents 104, 202 that are associated with a user profile 103 and that include respective fields 106, 204 associated with a field description 108, as described above with respect to FIGS. 1-4.

The method 1200 involves determining a first pattern of interactions with the first document that have occurred via the user profile, as depicted in block 1220. The document management application 102 may be executed by a suitable processing device to determine patterns of interactions with the documents 104, 202.

For example, a user profile 103 may be used to establish a session with a user in the document management application 102. The processing device can generate a log of data entry events or other interactions by the user with one or more of the documents 104, 202 that occur during the session. The processing device can generate the log by creating a record for each event that includes an identifier for the user profile 103, an identifier for the document affected by the event, a description of the event, and other relevant information about the event (e.g., a timestamp).

The processing device can analyze a set of interactions to determine one or more patterns associated with how the user interacts with the document. For example, a user may receive documents such income tax forms on a certain date (e.g., January 15). The processing device can determine that a user completes all fields of the tax form within a certain time period (e.g., on or before March 15).

The method 1200 also involves determining that a second pattern of interactions with the second document that have occurred via the user profile is different from the first pattern of interactions with the first document, as depicted in block 1230. The document management application 102 may be executed by a suitable processing device to determine differences in patterns of interactions with the documents 104, 202. For example, the processing device can generate logs of data events associated with each of the documents 104, 202 and determine patterns of interactions for each document, as described above with respect to block 1220. The processing device can compare the patterns of interactions to determine that a user has interacted differently with the document 104 as compared to the document 202.

The difference in interactions may indicate an absence of a required action or a delay in the required action with respect to one of the documents. For example, the document 104 may be an income tax form received on January 15 of a first year and the document 202 may be an income tax form received on January 15 of a second year. The document management application 102 can determine that the user completed all fields of the first income tax form by March 15 of the first year. The document management application 102 can also determine that the user has not completed all fields of the second income tax form by March 15 of the second year. The incomplete status of the second tax form as of March 15 may indicate that a user should be reminded to complete the second tax form or otherwise indicate that the second tax form should be prioritized for data entry ahead of other documents.

The method 1200 also involves providing a notification via the user profile based on determining that the first and second patterns are different from each another, as depicted in block 1240. The notification can be provided based on both the first and second fields being associated with a common field description. A processing device can execute the document management application 102 to determine that documents 104, 202 are similar types of documents based on each of the documents 104, 202 having one or more fields associated with one or more common field descriptions. For example, each of the documents 104, 202 may have a respective field that is associated with a field description 108 that is indicative of an income tax form, such as "Annual Taxable Income." The processing device can determine that both of the documents 104, 202 are income tax forms based at least partially on both documents having fields associated with the field description 108 titled "Annual Taxable Income." The processing device can determine that a difference in the patterns of interactions with respect to the two documents may indicate that the user has not completed a required task with respect to one of the documents. The processing device can generate and output a suitable notification to the user regarding the difference in the patterns of interactions.

The notification outputted to a user can indicate to the user that certain documents should be prioritized for data entry or otherwise categorized. For example, FIG. 14 is a modeling diagram depicting an example of an interface 1302 of a document management application 102 for prioritizing entry of data into electronic documents. The interface 1302 can use one or more visual indicators to indicate different priorities for different documents. In one non-limiting example, the document management application 102 may generate or modify the interface 1302 so that the interface 1302 includes a visual element 1304 (e.g., an asterisk, an exclamation point, the word "high," etc.) adjacent to a higher priority document. In another non-limiting example, the document management application 102 may display a list of documents in which the higher priority documents are listed before lower priority documents.

The document management application 102 can assign a priority to a given document or otherwise categorize the document in any suitable manner. In some embodiments, the document management application 102 assigns a priority for data entry to a document or otherwise categorizes the document based on a user's past interactions with similar documents, as described above with respect to FIG. 13.

In additional or alternative embodiments, the document management application 102 assigns a priority to an electronic document or otherwise categorizes the document based on a source of the electronic document. In one non-limiting example, the document management application 102 can assign a priority to a document based on the document being downloaded from a given website (e.g., downloading an income tax form from "IRS.xyz"). In another non-limiting example, the document management application 102 can assign a priority to a document based on the document being received as an e-mail attachment from a certain sender or from a certain domain (e.g., receiving an income tax form from an e-mail address associated with the user's accountant).

In additional or alternative embodiments, the document management application 102 assigns a priority to a document or otherwise categorizes the document based on detecting content within the document that is indicative of a priority or other category. For example, the document management application 102 may perform OCR or another suitable content detection algorithm to detect content within a document. Some content in the document may directly indicate a deadline (e.g., text in the document stating "Return by Apr. 15, 2014") or other attribute of the document that indicates that the document is to be assigned a higher priority. Other content in the document may be used by the document management application 102 in conjunction with programmable rules to assign a higher priority to the document. For example, the document management application 102 may determine that a given form is an income tax form based on the document including fields such as "Annual Taxable Income." The document management application 102 may access a rule from a database or other data structure. The rule may specify that income tax forms are to be completed by a specified date (e.g., by April 15 of the current calendar year). The document management application 102 may assign a higher priority to the document based on the document being an income tax form governed by the rule.

Any suitable server or other computing system can be used to implement the document management application 102. For example, FIG. 15 is a block diagram depicting an example server system 1400 for implementing certain embodiments.

The server system 1400 can include a processor 1402 that is communicatively coupled to a memory 1404 and that executes computer-executable program instructions and/or accesses information stored in the memory 1404. The processor 1402 may comprise a microprocessor, an application-specific integrated circuit ("ASIC"), a state machine, or other processing device. The processor 1402 can include any of a number of processing devices, including one. Such a processor can include or may be in communication with a computer-readable medium storing instructions that, when executed by the processor 1402, cause the processor to perform the operations described herein.

The memory 1404 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The server system 1400 may also comprise a number of external or internal devices such as input or output devices. For example, the server system 1400 is shown with an input/output ("I/O") interface 1408 that can receive input from input devices or provide output to output devices. A bus 1406 can also be included in the server system 1400. The bus 1406 can communicatively couple one or more components of the server system 1400.

The server system 1400 can execute program code for the document management application 102. The program code for the document management application 102 may be resident in any suitable computer-readable medium and execute on any suitable processor. In one embodiment, the program code for the document management application 102 can reside in the memory 1404 at the server system 1400. In another embodiment, the program code for the document management application 102 can be accessed by the server system 1400 from a remote content provider via a data network. The document management application 102 stored in the memory 1404 can configure the processor 1402 to perform the operations described in FIGS. 1-10.

The server system 1400 can also include at least one network interface 1410. The network interface 1410 can include any device or group of devices suitable for establishing a wired or wireless data connection to one or more data networks 1412. Non-limiting examples of the network interface 1410 include an Ethernet network adapter, a modem, and/or the like.

The server system 1400 can communicate with a computing system 1414 via the data network 1412. A computing system 1414 can include any suitable computing device for executing a client application 1416 configured for accessing the document management application 102 via the network 1414. Non-limiting examples of a computing system 1414 include a desktop computer, a tablet computer, a laptop computer, or any other computing device. Non-limiting examples of a client application 1416 include a web browser application, a dedicated application for accessing the document management application 102, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   determining, by a processing device, that a document accessed from a computer-readable medium lacks existing metadata describing a field in the document;
   performing, by the processing device and based on determining that the document lacks the existing metadata, document-modification operations comprising:
      determining, by the processing device, that data entered into the field of the document corresponds to a value of a field description included in a user profile, and
      modifying, by the processing device and based on the data entered into the field corresponding to the value of the field description, the document to include a tag that is applied to the field, wherein the tag comprises metadata with the field description; and
   performing, by a document management application executed by the processing device and accessed with the user profile, operations comprising:
      scanning a user document associated with the user profile,
      identifying, from scanning the user document, a link to a web document at a remote resource, wherein the remote resource is independent of the document management application and accessible by the document management application via a data network,
      executing a crawler process that accesses, via the link, the web document from the remote resource and that identifies a web field in the web document,
      generating, from the crawler process, remote document data in a locally accessible storage location in which the document is stored, wherein the remote document data is generated specifically for the web document and associates the field description with the web field,
      modifying, based on identifying changed data in the field of the document, the remote document data to include the changed data for the field description, and
      updating the web field at the remote resource by copying the changed data from the remote document data to the web field of the web document at the remote resource, wherein the web field at the remote resource is updated based on the remote document data being modified to include the changed data for the field description.

2. The method of claim 1, wherein determining that the data entered into the field corresponds to the value of the field description comprises determining that at least some of the data entered into the field matches the value of the field description;
   wherein the field description comprises identification information for a user associated with the user profile,
   wherein the field is accessible for data entry via a user interface, wherein the data is entered into the field of the document via the user interface,
   wherein the method further comprises performing, by a document management application executed by the processing device and accessed with the user profile, operations comprising:
      obtaining the document from a first provider, wherein the document management application maintains the field description and performs, after obtaining the document from the first provider, the determination that the document lacks the existing metadata,
      obtaining an additional document from a second provider different from the first provider, wherein the second provider is different from the first provider,
      receiving, via a dashboard graphical interface generated by the document management application, data for entry into (i) the field of the document and (ii) an additional field of an additional document, wherein the additional field is tagged with the field description, and
      updating, based on the field description being associated with both the field and the additional field, at least one of the field and the additional field such that the field and the additional field include the data received via the dashboard graphical interface of the document management application.

3. The method of claim 1, further comprising maintaining a common field value in a set of documents that are managed via a document management dashboard accessed with the user profile and that have respective fields tagged with the field description, wherein the set of documents includes the document and an additional document, wherein maintaining the common field value in the set of documents comprises:
   detecting a change to data in a target field that is one of the field in the document and an additional field in the additional document, wherein the target field is tagged with the field description, wherein the changed data has the common field value;
   retrieving, responsive to detecting the change to the data, the set of documents from a data structure accessible via the document management dashboard,
   comparing, in each document from the set of documents, the common field value to a respective field value in a respective field that is tagged with the field description, and
   automatically updating, based on the comparison, data in another of the field in the document and the additional field in the additional document such that the updated data has the common field value.

4. The method of claim 3, further comprising, prior to detecting the change and updating the data in the other of the field in the document and the additional field in the additional document:
   opening the document for display in a graphical interface, wherein detecting the change comprises detecting a change to the data in the field in the document while the document is opened for display;
   opening the additional document for a separate display in the graphical interface that is independent of the display of the document; and
   closing the additional document, wherein updating the data comprises modifying the data of the additional field while the additional document is closed.

5. The method of claim 1, wherein an additional field in an additional document is tagged with the field description and the additional document is associated with the user profile, the method further comprising:
identifying a first pattern of multiple interactions, via the user profile, with multiple fields in the document;
determining that a second pattern of multiple interactions, via the user profile, with multiple fields in the additional document is different from the first pattern of multiple interactions; and
providing, via the user profile, a notification that the first pattern of multiple interactions is different from the second pattern of multiple interactions, wherein the notification is provided based at least partially on (i) the second pattern of multiple interactions being different from the first pattern of multiple interactions and (ii) the field in the document and the additional field in the additional document being tagged with the field description.

6. The method of claim 5, wherein each of the document and the additional document are received from a network domain specific to a common provider,
wherein the notification is also provided based on:
(i) the document and the additional document being received from the network domain specific to the common provider, and
(ii) the determined difference between the first and second patterns of multiple interactions indicating a failure, with respect to one of the document or the additional document, to complete a task required by the common provider,
wherein the notification causes the one of the document or the additional document to be displayed, via the user profile, with a visual indicator of a higher priority as compared to other documents displayed via the user profile.

7. The method of claim 6, further comprising causing the one of the document or the additional document to be displayed, via the user profile, with the visual indicator of a higher priority by displaying the visual indicator in a listing of documents, wherein the listing of documents includes (i) the other documents and (ii) the one of the document or the additional document.

8. A system comprising:
a processing device; and
a non-transitory computer readable medium communicatively coupled to the processing device,
wherein the processing device is configured to execute instructions to perform operations comprising:
determining that a document lacks existing metadata describing a field in the document,
based on determining that the document lacks the existing metadata:
(i) determining that data entered into the field of the document corresponds to a value of a field description included in a user profile, and
(ii) modifying, based on the data entered into the field corresponding to the value of the field description, the document to include a tag that is applied to the field, wherein the tag comprises metadata with the field description,
wherein the instructions comprise a document management application and the processing device is further configured to execute the document management application to perform additional operations comprising:
scanning a user document associated with the user profile,
identifying, from scanning the user document, a link to a web document at a remote resource, wherein the remote resource is independent of the document management application and accessible by the document management application via a data network,
executing a crawler process that accesses, via the link, the web document from the remote resource and that identifies a web field in the web document,
generating, from the crawler process, remote document data in a locally accessible storage location in which the document is stored, wherein the remote document data is generated specifically for the web document and associates the field description with the web field,
modifying, based on identifying changed data in the field of the document, the remote document data to include the changed data for the field description, and
updating the web field at the remote resource by copying the changed data from the remote document data to the web field of the web document at the remote resource, wherein the web field at the remote resource is updated based on the remote document data being modified to include the changed data for the field description.

9. The system of claim 8, wherein determining that the data entered into the field corresponds to the value of the field description comprises determining that at least some of the data entered into the field matches the value of the field description;
wherein the field description comprises identification information for a user associated with the user profile,
wherein the field is accessible for data entry via a user interface, wherein the data is entered into the field of the document via the user interface,
wherein the instructions comprise a document management application, wherein the processing device is further configured to execute the document management application and thereby perform additional operations comprising:
obtaining the document from a first provider, wherein executing the document management application causes the processing device to (i) maintain the field description, (ii) perform, after obtaining the document from the first provider, the determination that the document lacks the existing metadata, and (iii) perform, based on the determination that the document lacks the existing metadata, the determination that the data entered into the field corresponds to the value of the field description and the modification of the document to include the tag,
obtaining an additional document from a second provider different from the first provider, wherein the second provider is different from the first provider,
generating a dashboard graphical interface;
receiving, via the dashboard graphical interface, data for entry into (i) the field of the document and (ii) an additional field of an additional document, wherein the additional field is tagged with the field description, and
updating, based on the field description being associated with both the field and the additional field, at least one of the field and the additional field such that the field and the additional field include the data received via the dashboard graphical interface of the document management application.

10. The system of claim 8, wherein an additional field in an additional document is tagged with the field description and the additional document is associated with the user profile, wherein the operations further comprise:
identifying a first pattern of multiple interactions, via the user profile, with multiple fields in the document;
determining that a second pattern of multiple interactions, via the user profile, with multiple fields in the additional document is different from the first pattern of multiple interactions; and
providing, via the user profile, a notification that the first pattern of multiple interactions is different from the second pattern of multiple interactions, wherein the notification is provided based at least partially on (i) the second pattern of multiple interactions being different from the first pattern of multiple interactions and (ii) the field in the document and the additional field in the additional document being tagged with the field description.

11. The system of claim 10, wherein each of the document and the additional document are received from a network domain specific to a common provider,
wherein the notification is also provided based on:
(i) the document and the additional document being received from the network domain specific to the common provider, and
(ii) the determined difference between the first and second patterns of multiple interactions indicating a failure, with respect to one of the document or the additional document, to complete a task required by the common provider,
wherein the processing device is configured to provide the notification by causing the one of the document or the additional document to be displayed, via the user profile, with a visual indicator of a higher priority as compared to other documents displayed via the user profile.

12. The system of claim 11, wherein causing the one of the document or the additional document to be displayed with the visual indicator of the higher priority comprises displaying the visual indicator in a listing of documents, wherein the listing of documents includes (i) the other documents and (ii) the one of the document or the additional document.

13. The system of claim 8, wherein an additional field in an additional document is tagged with the field description and the additional document is associated with the user profile, wherein the operations further comprise:
opening the additional document for display in a graphical interface;
closing the additional document;
opening the document for a separate display in the graphical interface that is independent of displaying the additional document;
identifying, while the document is opened for display, a change to data in the field in the document; and
modifying, while the additional document is closed, data in the additional field in the additional document based on identifying the change to the data.

14. A non-transitory computer-readable medium having program code stored thereon, the program code comprising:
program code for determining that data entered into a field in a document corresponds to a value of a field description included in a user profile, wherein the document lacks existing metadata describing the field;
program code for performing document-modification operations comprising:
modifying, based on based on the data entered into the field corresponding to the value of the field description, the document to include a tag that is applied to the field, wherein the tag comprises metadata the field description, and
associating the document with the user profile; and
program code for a document management application that is accessed with the user profile to perform operations comprising:
scanning a user document associated with the user profile,
identifying, from scanning the user document, a link to a web document at a remote resource, wherein the remote resource is independent of the document management application and accessible by the document management application via a data network,
executing a crawler process that accesses, via the link, the web document from the remote resource and that identifies a web field in the web document,
generating, from the crawler process, remote document data in a locally accessible storage location in which the document is stored, wherein the remote document data is generated specifically for the web document and associates the field description with the web field,
modifying, based on identifying changed data in the field of the document, the remote document data to include the changed data for the field description, and
updating the web field at the remote resource by copying the changed data from the remote document data to the web field of the web document at the remote resource, wherein the web field at the remote resource is updated based on the remote document data being modified to include the changed data for the field description.

15. A method comprising:
determining, by a processing device, that a document accessed from a computer-readable medium lacks existing metadata describing a field in the document;
performing, by the processing device and based on determining that the document lacks the existing metadata, document-modification operations comprising:
determining, by the processing device, that data entered into the field of the document corresponds to a value of a field description included in a user profile, and
modifying, by the processing device and based on the data entered into the field corresponding to the value of the field description, the document to include a tag that is applied to the field, wherein the tag comprises metadata with the field description, wherein an additional field in an additional document is tagged with the field description and the additional document is associated with the user profile;
identifying a first pattern of multiple interactions, via the user profile, with multiple fields in the document;
determining that a second pattern of multiple interactions, via the user profile, with multiple fields in the additional document is different from the first pattern of multiple interactions; and
providing, via the user profile, a notification that the first pattern of multiple interactions is different from the second pattern of multiple interactions, wherein the notification is provided based at least partially on (i) the second pattern of multiple interactions being different from the first pattern of multiple interactions and (ii)

the field in the document and the additional field in the additional document being tagged with the field description.

16. The method of claim 15, wherein determining that the data entered into the field corresponds to the value of the field description comprises determining that at least some of the data entered into the field matches the value of the field description;
wherein the field description comprises identification information for a user associated with the user profile,
wherein the field is accessible for data entry via a user interface, wherein the data is entered into the field of the document via the user interface,
wherein the method further comprises performing, by a document management application executed by the processing device and accessed with the user profile, operations comprising:
obtaining the document from a first provider, wherein the document management application maintains the field description and performs, after obtaining the document from the first provider, the determination that the document lacks the existing metadata,
obtaining an additional document from a second provider different from the first provider, wherein the second provider is different from the first provider,
receiving, via a dashboard graphical interface generated by the document management application, data for entry into (i) the field of the document and (ii) an additional field of an additional document, wherein the additional field is tagged with the field description, and
updating, based on the field description being associated with both the field and the additional field, at least one of the field and the additional field such that the field and the additional field include the data received via the dashboard graphical interface of the document management application.

17. The method of claim 15, further comprising maintaining a common field value in a set of documents that are managed via a document management dashboard accessed with the user profile and that have respective fields tagged with the field description, wherein the set of documents includes the document and an additional document, wherein maintaining the common field value in the set of documents comprises:
detecting a change to data in a target field that is one of the field in the document and an additional field in the additional document, wherein the target field is tagged with the field description, wherein the changed data has the common field value;
retrieving, responsive to detecting the change to the data, the set of documents from a data structure accessible via the document management dashboard,
comparing, in each document from the set of documents, the common field value to a respective field value in a respective field that is tagged with the field description, and
automatically updating, based on the comparison, data in another of the field in the document and the additional field in the additional document such that the updated data has the common field value.

18. The method of claim 15, wherein each of the document and the additional document are received from a network domain specific to a common provider,
wherein the notification is also provided based on:
(i) the document and the additional document being received from the network domain specific to the common provider, and
(ii) the determined difference between the first and second patterns of multiple interactions indicating a failure, with respect to one of the document or the additional document, to complete a task required by the common provider,
wherein the notification causes the one of the document or the additional document to be displayed, via the user profile, with a visual indicator of a higher priority as compared to other documents displayed via the user profile.

19. A system comprising:
a processing device; and
a non-transitory computer readable medium communicatively coupled to the processing device,
wherein the processing device is configured to execute instructions to perform operations comprising:
determining that a document lacks existing metadata describing a field in the document,
based on determining that the document lacks the existing metadata:
(i) determining that data entered into the field of the document corresponds to a value of a field description included in a user profile, and
(ii) modifying, based on the data entered into the field corresponding to the value of the field description, the document to include a tag that is applied to the field, wherein the tag comprises metadata with the field description wherein an additional field in an additional document is tagged with the field description and the additional document is associated with the user profile,
identifying a first pattern of multiple interactions, via the user profile, with multiple fields in the document,
determining that a second pattern of multiple interactions, via the user profile, with multiple fields in the additional document is different from the first pattern of multiple interactions, and
providing, via the user profile, a notification that the first pattern of multiple interactions is different from the second pattern of multiple interactions, wherein the notification is provided based at least partially on (i) the second pattern of multiple interactions being different from the first pattern of multiple interactions and (ii) the field in the document and the additional field in the additional document being tagged with the field description.

20. The system of claim 19, wherein determining that the data entered into the field corresponds to the value of the field description comprises determining that at least some of the data entered into the field matches the value of the field description;
wherein the field description comprises identification information for a user associated with the user profile,
wherein the field is accessible for data entry via a user interface, wherein the data is entered into the field of the document via the user interface,
wherein the instructions comprise a document management application, wherein the processing device is further configured to execute the document management application and thereby perform additional operations comprising:
obtaining the document from a first provider, wherein executing the document management application causes the processing device to (i) maintain the field description, (ii) perform, after obtaining the document from the first provider, the determination that the document lacks the existing metadata, and (iii) perform, based on the determination that the document lacks the existing metadata, the determination that the data entered into the field corresponds to the value of the field description and the modification of the document to include the tag, obtaining an additional document from a second provider different from the first provider, wherein the second provider is different from the first provider, generating a dashboard graphical interface;

receiving, via the dashboard graphical interface, data for entry into (i) the field of the document and (ii) an additional field of an additional document, wherein the additional field is tagged with the field description, and updating, based on the field description being associated with both the field and the additional field, at least one of the field and the additional field such that the field and the additional field include the data received via the dashboard graphical interface of the document management application.

21. The system of claim 19, wherein an additional field in an additional document is tagged with the field description and the additional document is associated with the user profile, wherein the operations further comprise:

identifying a first pattern of multiple interactions, via the user profile, with multiple fields in the document;

determining that a second pattern of multiple interactions, via the user profile, with multiple fields in the additional document is different from the first pattern of multiple interactions; and providing, via the user profile, a notification that the first pattern of multiple interactions is different from the second pattern of multiple interactions, wherein the notification is provided based at least partially on (i) the second pattern of multiple interactions being different from the first pattern of multiple interactions and (ii) the field in the document and the additional field in the additional document being tagged with the field description.

22. A non-transitory computer-readable medium having program code stored thereon, the program code comprising:

program code for determining that data entered into a field in a document corresponds to a value of a field description included in a user profile, wherein the document lacks existing metadata describing the field;

program code for performing document-modification operations comprising:

modifying, based on based on the data entered into the field corresponding to the value of the field description, the document to include a tag that is applied to the field, wherein the tag comprises metadata the field description, and associating the document with the user profile, wherein an additional field in an additional document is tagged with the field description and the additional document is associated with the user profile;

program code for identifying a first pattern of multiple interactions, via the user profile, with multiple fields in the document;

program code for determining that a second pattern of multiple interactions, via the user profile, with multiple fields in the additional document is different from the first pattern of multiple interactions; and program code for providing, via the user profile, a notification that the first pattern of multiple interactions is different from the second pattern of multiple interactions, wherein the notification is provided based at least partially on (i) the second pattern of multiple interactions being different from the first pattern of multiple interactions and (ii) the field in the document and the additional field in the additional document being tagged with the field description.

* * * * *